(12) United States Patent
Kido et al.

(10) Patent No.: US 8,310,626 B2
(45) Date of Patent: Nov. 13, 2012

(54) LIQUID CRYSTAL LIGHT CONTROL DEVICE AND METHOD FOR PRODUCING THE SAME COMPRISING A STEP OF EMULSION POLYMERIZATION OF MONOMERS OF A LIQUID CRYSTAL RESIN COMPOSITE

(75) Inventors: Masaatsu Kido, Tokyo (JP); Mitsuhiro Kawazu, Tokyo (JP); Yuichi Yano, Tokyo (JP); Daisuke Shiraishi, Osaka (JP); Hitoshi Shinike, Osaka (JP)

(73) Assignees: Nippon Sheet Glass Company, Limited, Tokyo (JP); Daido Chemical Corporation, Osaka (JP)

( * ) Notice: Subject to any disclaimer, the term of this patent is extended or adjusted under 35 U.S.C. 154(b) by 284 days.

(21) Appl. No.: 12/744,659

(22) PCT Filed: Nov. 13, 2008

(86) PCT No.: PCT/JP2008/070666
§ 371 (c)(1),
(2), (4) Date: Aug. 23, 2010

(87) PCT Pub. No.: WO2009/069473
PCT Pub. Date: Jun. 4, 2009

(65) Prior Publication Data
US 2010/0302476 A1 Dec. 2, 2010

(30) Foreign Application Priority Data
Nov. 28, 2007 (JP) ................... 2007-307944

(51) Int. Cl.
*G02F 1/1333* (2006.01)
*H01L 21/00* (2006.01)
(52) U.S. Cl. ................. 349/88; 349/89; 438/30
(58) Field of Classification Search ............ 349/86, 349/88, 90, 187; 438/30
See application file for complete search history.

(56) References Cited

U.S. PATENT DOCUMENTS

| | | | |
|---|---|---|---|
| 4,435,047 A | 3/1984 | Fergason | |
| 4,992,201 A | 2/1991 | Pearlman | |
| 5,498,450 A | 3/1996 | Akashi et al. | |
| 6,049,366 A * | 4/2000 | Hakemi et al. | 349/86 |
| 2006/0238862 A1* | 10/2006 | Yano | 359/460 |
| 2010/0014150 A1* | 1/2010 | Higashida et al. | 359/296 |

FOREIGN PATENT DOCUMENTS

JP 58-501631 A 9/1983
(Continued)

*Primary Examiner* — Mark Robinson
*Assistant Examiner* — Paul Lee
(74) *Attorney, Agent, or Firm* — Hamre, Schumann, Mueller & Larson, P.C.

(57) ABSTRACT

In the production method of the present invention, an emulsion including a copolymer with a glass transition temperature (Tg) of −50 to 20° C. is obtained by the emulsion polymerization of a monomer group including a monomer A that is a (meth)acrylic acid alkyl ester (where the alkyl group is an open chain group with 1 to 20 carbon atoms or a cyclic group with 5 to 20 carbon atoms) as the main monomer and a monomer B having a carbon-carbon double bond and a non-ionic hydrophilic group such as a polyoxyalkylene group, an amide group, and a hydroxyl group. Liquid crystals are dispersed in this emulsion, which is applied onto a conductive film-coated substrate. Another conductive film-coated substrate is laminated thereto, and thus a liquid crystal light control device is obtained. A monomer C having a carboxyl group and/or an amino group and a carbon-carbon double bond may be used in combination with a crosslinking agent so that a crosslinked structure is introduced into the copolymer. The present invention provides a liquid crystal light control device in which the transparency with a voltage applied and the shielding property with no voltage applied are compatible at high level.

11 Claims, 1 Drawing Sheet

FOREIGN PATENT DOCUMENTS

| | | |
|---|---|---|
| JP | 60-252687 A | 12/1985 |
| JP | 5-066391 A | 3/1993 |
| JP | 5-289068 A | 11/1993 |
| JP | 6-175112 A | 6/1994 |
| JP | 11-500757 A | 6/1996 |
| JP | 2001-247634 A | 9/2001 |
| JP | 2004-302194 A | 10/2004 |
| WO | WO 96/19547 A1 | 6/1996 |

* cited by examiner

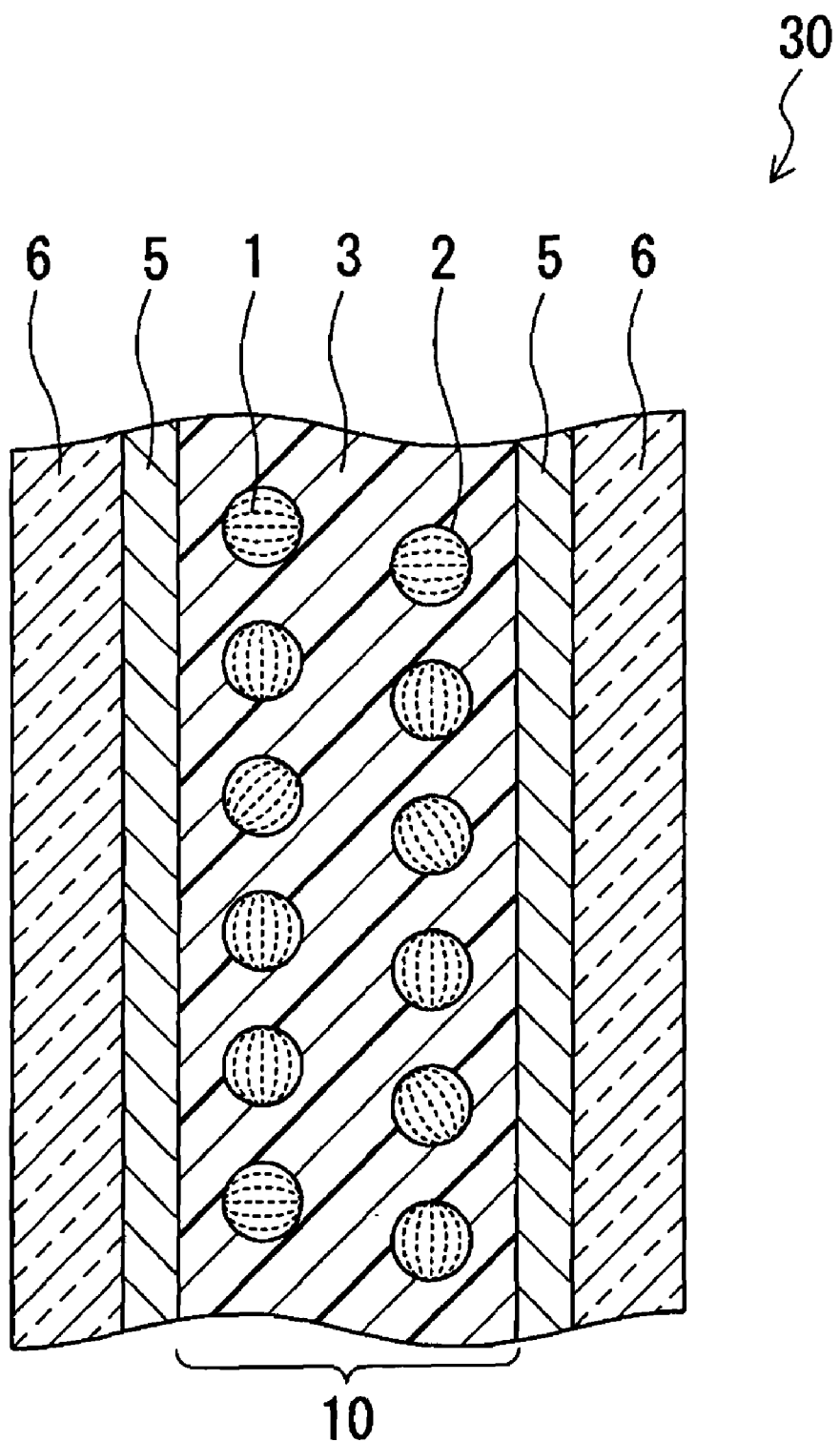

LIQUID CRYSTAL LIGHT CONTROL DEVICE AND METHOD FOR PRODUCING THE SAME COMPRISING A STEP OF EMULSION POLYMERIZATION OF MONOMERS OF A LIQUID CRYSTAL RESIN COMPOSITE

TECHNICAL FIELD

The present invention relates to a liquid crystal light control device having a function of controlling the visibility.

BACKGROUND ART

A liquid crystal light control device having a function of controlling the visibility is already commercially available as "switchable light control glass" ("UMU", registered trademark, manufactured by Nippon Sheet Glass Co., Ltd.). Such glass changes its state instantaneously and reversibly between a transparent state and an opaque state in response to the application of a voltage. In the latter state, light incident on glass scatters to block human visibility in the same manner as in frosted glass, the surface of which is roughened, for example, by sandblasting. Light control liquid crystal devices are employed as partitions for conference rooms, shop windows, vehicle windows and the like.

The liquid crystal light control device has a structure in which a liquid crystal-resin composite produced by dispersion of liquid crystal microparticles in a resin binder (resin matrix) is disposed between two conductive film-coated substrates. In the liquid crystal light control device, the arrangement of the liquid crystal molecules constituting each liquid crystal microparticle changes in response to the application of a voltage to the conductive films. As the arrangement of the liquid crystal molecules changes, the degree of the scattering of light incident on the device also changes corresponding to it. The liquid crystal molecules cause a high degree of scattering of the incident light with no voltage applied (in a voltage free state). Meanwhile, with a voltage applied, the liquid crystal molecules are arranged along the direction of the electric field so that the degree of the scattering incident light is reduced, thereby leading to a transparent state (clear state).

Polyvinyl alcohol, polyethylene glycol, polyurethane, and the like have been studied as the resin matrix for the liquid crystal-resin composite. Among these resins, polyurethane is excellent in view of processability, heat resistance and the like. Although it is possible to use a phase separation process or emulsion process for the dispersion of the liquid crystal microparticles in the resin matrix, the emulsion process has been put to practical use. In the emulsion process, an emulsion including a liquid crystal material is stirred at high speed, thereby allowing the liquid crystal microparticles to be dispersed, that is, the liquid crystals to be "encapsulated".

It should be noted that the term "encapsulated" is merely a conventional expression that has been used because liquid crystals are observed as if they were enclosed in capsules. Strictly speaking, both in conventional products and the below-mentioned liquid crystal light control device of the embodiments of the present invention, the liquid crystal material is not enclosed in capsules, but it itself is formed into microparticles that are dispersed in a resin matrix. Although the terms "encapsulated" and "liquid crystal capsules" may be used hereinafter according to conventional usage also in this description, they are not intended to mean that capsules are assumed to be present independently of the resin matrix and liquid crystal material.

JP 60(1985)-252687 A discloses a liquid crystal light control device employing polyurethane as a resin matrix. This publication discloses that polymers such as polyethylene, polypropylene, and polyacrylic, and in addition, copolymers such as methacrylate/acrylonitrile, urethane/acrylic, and acrylate/acrylonitrile may be used as a resin matrix. JP 60(1985)-252687 A describes also that a crosslinked structure may be introduced into the resin matrix using a crosslinking agent.

JP 11(1999)-500757 T discloses a method for producing a liquid crystal-resin composite using an emulsion including at least two types of monofunctional (meth)acrylic esters, at least one type of a polyfunctional (meth)acrylic compound, and a photoinitiator, at a predetermined ratio. The invention described in this publication is directed to an improvement of a liquid crystal light control device achieved by focusing on a parameter called an operating field. According to JP 11(1999)-500757 T, the monofunctional (meth)acrylic esters each desirably have a functional group having a chain length of 6 rather than an alkyl group having a chain length of less than 6 in order to keep the operating field low (see FIG. 6 in the publication).

In addition to the above publications, JP 58(1983)-501631 T, JP 5(1993)-66391 A, JP 5(1993)-289068 A, and JP 2004-302194 A also disclose conventional liquid crystal light control devices.

The transparency with a voltage applied is a frequent issue among the properties of the liquid crystal light control devices in the above-mentioned uses. Liquid crystal light control devices appear slightly cloudy even with a voltage applied compared to ordinary transparent glass sheets. The transparency of a liquid crystal light control device with a voltage applied can be improved by making the liquid crystal-resin composite thinner. However, when the thickness of the liquid crystal-resin composite is reduced, the liquid crystal light control device lacks the shielding property with no voltage applied. Thus, there is a trade-off relationship between the transparency with a voltage applied and the shielding property with no voltage applied. Therefore, it is impossible to solve the above-mentioned problem only by adjusting the thickness of the liquid crystal-resin composite.

DISCLOSURE OF THE INVENTION

It is an object of the present invention to provide a liquid crystal light control device in which the transparency with a voltage applied and the shielding property with no voltage applied both are compatible at a high level.

In order to achieve the above-mentioned object, the present invention provides a method for producing a liquid crystal light control device. The device includes two conductive film-coated substrates disposed so that the conductive films on the substrates face each other, and a liquid crystal-resin composite sandwiched between the two conductive film-coated substrates. The liquid crystal-resin composite has a resin matrix and liquid crystal microparticles dispersed in the resin matrix. The method includes the following step a) to step d).

In step a), an emulsion including a copolymer that has a glass transition temperature in the range of −50° C. to 20° C. is obtained by emulsion polymerization of a monomer group including a monomer A as the main monomer and a monomer B. The monomer A is expressed by the following formula 1. The monomer B has a nonionic hydrophilic group and a carbon-carbon double bond.

In step b), a liquid crystal-resin composite material is prepared from a raw material including the above-mentioned emulsion and a liquid crystal material. The liquid crystal-resin composite material includes the above-mentioned copolymer and liquid crystal microparticles dispersed therein.

In step c), a liquid crystal-resin composite including a resin matrix and liquid crystal microparticles is formed on a conductive film of a conductive film-coated substrate by applying the above-mentioned liquid crystal-resin composite material onto the conductive film. The liquid crystal microparticles are dispersed in the resin matrix.

In step d), another conductive film-coated substrate is bonded to the liquid crystal-resin composite so that the liquid crystal-resin composite is sandwiched between the two conductive film-coated substrates and the conductive films each are in contact with the liquid crystal-resin composite.

Formula 1:

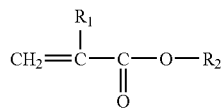

(1)

Here, $R_1$ is a hydrogen atom or a methyl group, and $R_2$ is an open chain alkyl group having a straight or branched chain with 1 to 20 carbon atoms or a cyclic alkyl group with 5 to 20 carbon atoms.

The present invention provides a liquid crystal light control device including two conductive film-coated substrates disposed so that the conductive films on the substrates face each other, and a liquid crystal-resin composite disposed between the two conductive film-coated substrates. The liquid crystal-resin composite has a resin matrix and liquid crystal microparticles dispersed in the resin matrix. In the liquid crystal light control device, the above-mentioned resin matrix includes a copolymer of a monomer group including the above-mentioned monomer A as the main monomer and the above-mentioned monomer B. The copolymer has a glass transition temperature in the range of −50° C. to 20° C.

According to another aspect of the present invention, there is provided a liquid crystal light control device in which the resin matrix includes a copolymer including a monomer expressed by the above-mentioned formula 1 as the main monomer. The copolymer has a nonionic hydrophilic group and a crosslinked structure introduced therein.

In this description, the expression "(meth)acrylic" means "methacrylic or acrylic", and similarly, the expression "(meth)acryloyl" means "methacryloyl or acryloyl". The "main monomer" herein means a monomer that accounts for at least 75 mass %, preferably at least 80 mass %, more preferably at least 85 mass %, particularly preferably at least 90 mass %, in the monomer group. The monomer A constituting the "main monomer" may be composed of one type of monomers or may be composed of two or more types of monomers. The monomer B and the later-mentioned monomers C to D also may be composed of one type of monomers, or two or more types of monomers.

At least one of the causes for the slightly cloudy appearance of the liquid crystal light control device with a voltage applied is the imperfection of the orientation of liquid crystal molecules constituting each of liquid crystal microparticles. In the production method of the present invention, a copolymer including the above-mentioned monomer A and monomer B is used for forming a resin matrix. This copolymer is suitable for improving the transparency of a liquid crystal light control device with a voltage applied.

Based on the premise that such a copolymer is used, the glass transition temperature (Tg) of the copolymer is adjusted to an appropriate range in the present invention. The adjustment of Tg to 20° C. or less facilitates the formation of the liquid crystal-resin composite by applying the liquid crystal-resin composite material onto the conductive film-coated substrate. Further, it facilitates also the bonding of the other conductive film-coated substrate to the liquid crystal-resin composite. When Tg is excessively high, the formation of a film shaped product is difficult even if the liquid crystal-resin composite material is applied onto the substrate, and the adhesion of the liquid crystal-resin composite is reduced. On the other hand, when Tg is low to an extent of less than −50° C., the bonding strength of the resin matrix rather decreases. Poor bonding conditions between the liquid crystal-resin composite and the conductive film reduces the orientation of the liquid crystal molecules. An appropriate control of Tg can contribute to the improvement of the transparency of the liquid crystal light control device through the improvement of the orientation of the liquid crystal molecules.

The present invention enables the transparency with a voltage applied to be improved while the thickness of the liquid crystal-resin composite is maintained, thus making it possible to implement the industrial production of liquid crystal light control devices in which the transparency with a voltage applied and the shielding property with no voltage applied are compatible at a high level.

BRIEF DESCRIPTION OF THE DRAWING

FIG. 1 is a partial sectional view indicating one example of a liquid crystal light control device.

BEST MODE FOR CARRYING OUT THE INVENTION

In the production method of the liquid crystal light control device of the present invention, an emulsion (polymer emulsion) including a copolymer is first prepared in the step a). A monomer group constituting the copolymer includes monomers A and B as its essential monomers, and the monomer A is the main monomer of the copolymer.

The monomer A is (meth)acrylic acid alkyl ester or (meth) acrylic acid cycloalkyl ester expressed by the above-mentioned formula 1.

Examples of the (meth)acrylic acid alkyl ester include methyl (meth)acrylate, ethyl (meth)acrylate, butyl (meth) acrylate, iso-butyl (meth)acrylate, sec-butyl (meth)acrylate, tert-butyl (meth)acrylate, propyl (meth)acrylate, 2-ethylhexyl (meth)acrylate, octyl (meth)acrylate, iso-octyl (meth) acrylate, iso-decyl (meth)acrylate, lauryl (meth)acrylate, iso-dodecyl (meth)acrylate, iso-tridecyl (meth)acrylate, myristyl (meth)acrylate, cetyl (meth)acrylate, stearyl (meth)acrylate, iso-octadecyl (meth)acrylate, and icosyl (meth)acrylate.

Examples of the (meth)acrylic acid cycloalkyl ester include cyclopentyl (meth)acrylate, cyclohexyl (meth)acrylate, butylcyclohexyl (meth)acrylate, dicyclopentanyl (meth) acrylate, and isobornyl (meth)acrylate.

In the present invention, the $R_2$ group of the monomer A (see formula 1) is a particular open chain alkyl group or cyclic alkyl group, preferably an open chain alkyl group, so that the interaction between the copolymer and the liquid crystal molecules is reduced. The monomer A reduces the interaction between the resin matrix and the liquid crystal molecules constituting the liquid crystal microparticles in the liquid crystal-resin composite. This reduction in the interaction seems to contribute to the improvement of the orientation of the liquid crystal molecules with a voltage applied. Further, the reduction in the interaction between the liquid crystal molecules and the resin matrix enhances also the uniformity in the shape and size of the liquid crystal microparticles to be formed by the emulsion process. This uniformity facilitates the adjustment of the particle size of the liquid crystal microparticles within a preferable range for improving the transparency.

It is obvious for those skilled in the art of surfactants to use, as an emulsifier, a surfactant having a hydrophobic group with a structure similar to the product to be emulsified for the purpose of achieving good emulsification. If this knowledge is applied to the resin matrix of the liquid crystal light control device as it is, consideration should be given to the use of an aromatic compound such as styrene as the main component of the resin matrix for good dispersion of liquid crystal molecules. However, in the case of the resin matrix including an aromatic compound as the main component, the interaction between the resin matrix and liquid crystal molecules is increased too much, resulting in the inhibition of the "encapsulation" of liquid crystals. In the liquid crystal light control device of the present invention, although the combination use of an aromatic monomer is not completely eliminated, the monomer A that is a non-aromatic monomer is used as the main monomer constituting the copolymer.

As mentioned later, in the case of using the copolymer of the monomer group including the monomer A as the main monomer for the liquid crystal light control device, attention should be paid to the glass transition temperature (Tg) of the copolymer. Although Tg is not dependent only on the monomer A, an appropriate selection of the monomer A is most important in adjusting Tg to a preferable range. Two or more types of monomers each having mutually different $R_2$ in formula 1 may be used as the monomer A in order to adjust Tg and other properties to be considered with this (such as the strength of the resin matrix).

For improving the orientation of the liquid crystal molecules significantly, it is preferable to use, as the monomer A, only a monomer $A_1$ in which $R_2$ in formula 1 is an open chain alkyl group having a straight or branched chain with 1 to 20 carbon atoms. In the case of using a monomer $A_2$ in which $R_2$ is a cyclic alkyl group with 5 to 20 carbon atoms in combination with the monomer $A_1$, the content of the monomer $A_2$ may be less than that of the monomer $A_1$.

$R_2$ in formula 1 is preferably an open chain alkyl group having a straight or branched chain with 1 to 8 carbon atoms, more preferably an open chain alkyl group having a straight or branched chain with 1 to 4 carbon atoms. The copolymer in which a monomer satisfying these conditions accounts for the majority (exceeding 50 mass %) or the entire of the monomer A gives preferable results as indicated in the later-mentioned Examples.

The monomer B is a monomer having a nonionic hydrophilic group. The nonionic hydrophilic group is preferably at least one selected from an amide group, a hydroxyl group and a polyoxyalkylene group, more preferably an amide group and/or a hydroxyl group. In this description, the "amide group" is intended to mean not only primary amides but also any functional group having a so-called amide bond. Although the type of the monomer B is not limited as long as the monomer B is copolymerizable with the monomer A, it should be selected from monomers having a carbon-carbon double bond that is included, for example, in a (meth)acryloyl group or a vinyl group, as well as having a nonionic hydrophilic group. The carbon-carbon double bond included in the monomer B and the later-mentioned monomer C, and the carbon-carbon double bond that may be included in the later-mentioned monomer D preferably have free-radical polymerizability.

When the monomer B is used in combination with the monomer A, the nonionic hydrophilic group to be supplied by the monomer B acts to help the good "encapsulation" of the liquid crystal molecules in the liquid crystal-resin composite. As shown by the later-mentioned Comparative Examples, the absence of the monomer B may result even in the failure of the "encapsulation" of the liquid crystal molecules. Further, the nonionic hydrophilic group included in the monomer B acts to stabilize the emulsion polymerization of the monomer group including the monomer A most. The introduction of a nonionic hydrophilic group to the resin matrix by the monomer B possibly allows the balance between the hydrophilic portion and the hydrophobic portion in the resin matrix to fall within a preferable range for improving the properties of the liquid crystal light control device.

Examples of the amide group-containing monomer include (meth)acrylamide, N-methyl (meth)acrylamide, N,N-dimethyl (meth)acrylamide, N,N-diethyl (meth)acrylamide, N-methylol (meth)acrylamide, N-hydroxyethyl (meth)acrylamide, N-methoxymethyl (meth)acrylamide, N-butoxymethyl (meth)acrylamide, N-vinylpyrrolidone, N-vinylcaprolactam, N-vinylformamide, diacetoneacrylamide, aminoethyl (meth)acrylamide, N-methylaminoethyl (meth)acrylamide, N-ethylaminoethyl (meth)acrylamide, aminopropyl (meth)acrylamide, N-methylaminopropyl (meth)acrylamide, N-ethylaminopropyl (meth)acrylamide, and N-(meth)acryloylmorpholine.

Examples of the hydroxyl group-containing monomer include hydroxyalkyl (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and caprolactone(meth)acrylate. In addition to these, polyoxyethylene(meth)acrylate, polyoxypropylene(meth)acrylate, glycerol (meth)acrylate and the like may be used. Among the examples mentioned above as amide group-containing monomers, monomers having a hydroxyl group may be used.

As the polyoxyalkylene group-containing monomer, a monomer having a polyoxyalkylene group in which the alkylene group has 2 to 4 carbon atoms is suitable for use. This monomer may be a hydroxyl group-containing monomer at the same time, as is the case of polyoxyethylene mono(meth)acrylate. The polyoxyalkylene group-containing monomer may be polyoxyethylene monomethyl ether (meth)acrylate, polyoxyethylene monoethyl ether (meth)acrylate, polyoxyethylene di(meth)acrylate or the like.

The monomer B is preferably a non-aromatic monomer. Preferable examples of the monomer B include (meth)acrylamide and the derivatives thereof, and hydroxyalkyl (meth)acrylate.

A monomer C is a monomer having a carboxyl group and/or an amino group. Although the type of the monomer C is not limited as long as the monomer C is copolymerizable with the monomers A and B, it is selected from monomers having a carbon-carbon double bond. The carbon-carbon double bond may be included, for example, in (meth)acryloyl group or vinyl group, or may be included in unsaturated fatty acid. Carboxyl groups and amino groups have high reactivity, and thus are useful for the introduction of reactive sites with crosslinking agents in the copolymer. The introduction of a crosslinked structure facilitates giving the necessary strength to the liquid crystal-resin composite. Since a functional group with high reactivity is to be introduced, the term "amino group" herein is used to mean an amino group having an active hydrogen, that is, a primary amino group or a secondary amino group.

It should be noted that the monomer C is an arbitrarily introduced monomer for a crosslinked structure, and it is not essential even for the case of introducing a crosslinked structure. A hydroxyl group that may be included in the monomer B also can be used for introducing a crosslinked structure, though it is inferior to a carboxyl group and an amino group in reactivity. In the case where the hydroxyl group is used for introducing a crosslinked structure, a crosslinking agent having a functional group that reacts with the hydroxyl group, such as a glycidyl group and an epoxy group, may be used.

It should be noted that, in this description, a monomer having a nonionic hydrophilic group as well as a carboxyl group and/or an amino group is treated as the monomer B.

Examples of the carboxyl group-containing monomer include acrylic acid, methacrylic acid, crotonic acid, tiglic acid, angelic acid, senecioic acid, maleic acid, fumaric acid, itaconic acid, citraconic acid, mesaconic acid, glutaconic acid, monomethyl maleate, monoethyl maleate, monopropyl maleate, monobutyl maleate, monooctyl maleate, monodecyl maleate, monododecyl maleate, monotetradecyl maleate, monohexadecyl maleate, monostearyl maleate, monooleyl maleate, monomethoxyethyl maleate, monoethoxyethyl maleate, monobutoxyethyl maleate, monomethyl carbitol maleate, monoethyl carbitol maleate, monobutyl carbitol maleate, monobenzyl maleate, monomethyl fumarate, monoethyl fumarate, monopropyl fumarate, monobutyl fumarate, monooctyl fumarate, monodecyl fumarate, monododecyl fumarate, monotetradecyl fumarate, monohexadecyl fumarate, monostearyl fumarate, monooleyl fumarate, monomethoxyethyl fumarate, monoethoxyethyl fumarate, monobutoxyethyl fumarate, monomethyl carbitol fumarate, monoethyl carbitol fumarate, monobutyl carbitol fumarate, monobenzyl fumarate, acrylic acid dimer, and carboxyethyl (meth)acrylate.

Examples of the amino group-containing monomer include aminoethyl (meth)acrylate, N-methylaminoethyl (meth)acrylate, N-ethylaminoethyl (meth)acrylate, aminopropyl (meth)acrylate, N-methylaminopropyl (meth)acrylate, N-ethylaminopropyl (meth)acrylate, allylamine, methylallylamine, tetramethylpiperidyl (meth)acrylate, and 4-aminostyrene.

The monomer C is preferably a non-aromatic monomer as is the monomer B. Although the monomer C may be a monomer $C_2$ having an amino group, it preferably is a monomer $C_1$ having a carboxyl group, particularly at least one selected from (meth)acrylic acid, itaconic acid, maleic acid and the monoalkyl esters thereof, and fumaric acid and the monoalkyl ester thereof.

The monomer group may be composed of the following monomers:
75 to 99 mass % of the monomer A,
0.1 to 15 mass % of the monomer B,
0 to 15 mass % of the monomer C, preferably 0.1 to 15 mass %, and
0 to 10 mass % of a monomer D.

Here, the monomer D is a monomer not corresponding to any of the monomers A to C. The monomer D may be selected also from monomers having a carbon-carbon double bond. However, it is not required to have a carbon-carbon double bond as long as the monomer D is copolymerizable with the monomer A and the other monomers. The monomer D is an arbitrary monomer to be included in the monomer group, but the content thereof is preferably not more than 10 mass % as mentioned above.

An excessively low content of the monomer A might result in insufficient transparency of the liquid crystal light control device with a voltage applied, or might cause the glass transition temperature of the copolymer to be excessively high. The content of the monomer A is, in terms of mass % (hereinafter, every "%" means mass % in this paragraph), at least 80%, particularly preferably at least 85%, and it may be at least 90% depending on the circumstances. On the other hand, an excessively high content of the monomer A might hinder the "encapsulation" of the liquid crystal material, or may result in insufficient formation of the crosslinked structure to be introduced. Taking this into consideration, the content of the monomer A might be limited to not more than 98%, and it may be limited to as low as not more than 97%. The content of the monomer B is preferably at least 0.3%, further preferably at least 0.5% for sufficiently obtaining the above-mentioned effects of the nonionic hydrophilic group. On the other hand, the content of the monomer B may be limited to not more than 13%, further to not more than 10%, and it may be limited to as low as not more than 8% depending on the circumstances. The content of the monomer C is preferably at least 0.3%, further preferably at least 0.5% for sufficiently forming a crosslinked structure. On the other hand, an excessively high content of the monomer C might cause the water-solubility of the copolymer to be excessively high. For this reason, the content of the monomer C is limited preferably to not more than 13%, further not more than 10%, particularly not more than 7%, and it is limited preferably to not more than 6% depending on the circumstances. The content of the monomer D may be determined so that the object of the present invention is not impaired. Normally, it is preferably 8% or less, further 5% or less, particularly 3% or less, for example.

The type of the monomer D also is not limited as long as the monomer D is copolymerizable with the monomers A and B. For example, vinyl group-containing monomers, and (meth)acryloyl group-containing monomers may be used therefor. The monomer D may be added for the purpose of improving the adhesion with the substrates. An aromatic monomer such as styrene also may be used as the monomer D, but the monomer D is preferably a non-aromatic monomer for the same reasons as above mentioned. Examples of the type of the monomer D are as follows.

The examples are: glycidyl (meth)acrylate, 3-(meth)acryloyloxypropyltrimethoxysilane, 3-(meth)acryloyloxypropyltriethoxysilane, 3-(meth)acryloyloxypropyldimethoxymethylsilane, 3-(meth)acryloyloxypropyldiethoxymethylsilane, carbodiimide ethyl (meth)acrylate, tert-butyl carbodiimide ethyl (meth)acrylate, 2-acetoacetoxyethyl (meth)acrylate, 4-acetoacetoxybutyl (meth)acrylate, 2-acetoacetoxyethyl vinyl ether, 4-acetoacetoxybutyl vinyl ether, aziridine group-containing monomers, oxazoline group-containing monomers, N,N-dimethylaminoethyl (meth)acrylate, N,N-dimethylaminopropyl (meth)acrylate, (meth)acryloyloxyethyl-N,N,N-trimethylammonium chloride, 3-(meth)acryloylaminopropyl-N,N,N-trimethylammonium chloride, 3-(meth)acryloyloxy-2-hydroxypropyl-N,N,N-trimethylammonium chloride, allyldimethylamine, diallylmethylamine, diallyldimethylammonium chloride, vinylpyridine, 1-vinylimidazole, acrylonitrile, vinyl acetate, vinyl propionate, vinyl butyrate, vinyl valerate, vinyl pivalate, vinyl caproate, vinyl caprate, vinyl 2-ethylhexanoate, vinyl laurate, vinyl myristate, vinyl palmitate, vinyl stearate, vinyl versatate, vinyl benzoate, alkyl vinyl ether, tetrahydrofurfuryl (meth)acrylate, methoxyethyl (meth)acrylate, (meth)acryloyloxyethanesulfonate, 2-(meta)benzyl (meth)acrylate, phenoxyethyl (meth)acrylate, styrene, alpha-methyl styrene, ethylene glycol di(meth)acrylate, propylene glycol di(meth)acrylate, butanediol di(meth)acrylate, hexanediol di(meth)acrylate, and divinyl benzene.

In the case of adding the monomer D, glycidyl group-containing monomers, epoxy monomers such as epoxy group-containing monomers, silyl group-containing monomers, or tertiary amino group-containing monomers are preferable.

As has been mentioned above, in using a copolymer including the monomer A for the liquid crystal light control device, it is necessary to pay attention to the glass transition temperature (Tg) of the copolymer. This is because an excessively high Tg of the copolymer reduces the adhesion of the resin matrix, resulting in difficulty in disposing the liquid crystal-resin composite material between the conductive film-coated substrates. In the case of using a liquid crystal-resin composite material in which the copolymer has a high Tg, even if the lamination to the conductive film-coated substrates is possible, the composite degrades with time, and in an extreme case, film peeling may occur. Even if no film peeling occurs, if partial bonding defects occur between the liquid crystal-resin composite and the conductive films, the orientation of liquid crystals may decrease in that part. On the other hand, an excessively low Tg of the copolymer rather reduces the bonding strength of the resin matrix, which may impair the function to be integrated in the resin matrix to act as a binder for liquid crystal microparticles.

Meanwhile, even in the case of a high glass transition temperature (Tg) of the copolymer, the formation of the liquid crystal-resin composite is possible by adding a plasticizer in an amount sufficient to compensate for it. However, the addition of a plasticizer in a large amount may render the "encapsulation" of liquid crystals difficult, and the plasticizer may bleed on the intersurfaces between the liquid crystal-resin composite and conductive film-coated substrates, thus impairing the quality of the liquid crystal light control device. The adjustment of the Tg of the copolymer within a preferable range can reduce the plasticizer to be added to a slight amount, even if the plasticizer is needed. Rather, the appropriate adjustment of Tg can eliminate even the need to use the plasticizer. According to the present invention, it also is possible to constitute a liquid crystal light control device with good properties by a resin matrix that is free from plasticizers.

The glass transition temperature (Tg) of the copolymer is suitably $-50°$ C. to $20°$ C., and for the above-mentioned reasons, it is preferably $15°$ C. or less, more preferably $5°$ C. or less, particularly preferably $0°$ C. or less. It also may be $-10°$ C. or less. If an excessively low Tg is to be prevented, Tg may be set to at least $-40°$ C., and further to at least $-35°$ C.

Since the glass transition temperature (Tg) of the copolymer is affected strongly by the monomer to be added in a relatively large amount, the selection of the monomer A is to be performed appropriately in the present invention. The Tg from the monomer A indicated in formula 1 is affected strongly by the $R_2$ group. For example, glass transition temperatures of polymethylacrylate, polyethylacrylate, polypropylacrylate, and polyhexylacrylate decrease in this order. Tg of polypropylacrylate is $-44°$ C., and that of polyhexylacrylate is $-57°$ C. However, an excessively long $R_2$ group causes Tg of an acrylic acid ester polymer to be high. Further, an acrylic acid ester polymer tends to exhibit a lower Tg than a methacrylic acid ester polymer that has the same $R_2$ group as the acrylic acid ester polymer. Considering these, the setting of Tg within a preferable range may be achieved by using, as at least a part of the monomer A, a monomer $A_{11}$ having a hydrogen atom as the $R_1$ group, and an open chain alkyl group that has a straight or branched chain with 2 to 8, preferably 3 to 8, carbon atoms as the $R_2$ group in formula 1.

However, an excessively low Tg might cause the above-mentioned problems, and even if no such problems occur, when a low Tg is set, the strength of the liquid crystal-resin composite might decrease. In order to compensate for the decrease in strength, methacrylic acid alkyl esters having a short alkyl chain such as methyl methacrylate may be used as a part of the monomer. Considering this, the monomer A to be used in combination with the monomer $A_{11}$ is preferably a monomer $A_{12}$ having a methyl group as the $R_1$ group, and an open chain alkyl group that has a straight or branched chain with 1 to 4 carbon atoms as the $R_2$ group in formula 1.

The monomer A may include 40 to 75 mass %, preferably 50 to 75 mass % of the monomer $A_{11}$, and 20 to 55 mass %, preferably 20 to 45 mass % of the monomer $A_{12}$, with respect to the monomer group.

As confirmed by experiments, a particularly preferable result can be obtained by using the monomer A including the monomer $A_{11}$ and the monomer $A_{12}$ in combination with the monomer B having an amide group and/or a hydroxyl group as a nonionic hydrophilic group.

The emulsion polymerization in the step a) can be performed by a conventionally known process. The outline is described below.

As a surfactant for the emulsion polymerization, it is preferable to use an anionic surfactant and/or a nonionic surfactant, and particularly preferable to use these two types of surfactants in combination. The use of an anionic surfactant is preferable for maintaining the emulsion stability during the emulsion polymerization. However, the use of only the anionic surfactant causes insufficient insulation performance of the liquid crystal-resin composite. The use of a surfactant that enhances the conductivity in a large amount may cause operational failure due to electrical shorting when a voltage is applied. For this reason, the use of a nonionic surfactant in combination with an anionic surfactant is preferable.

Examples of the anionic surfactant include fatty acid soaps, alkyl sulfate, alkyl sulfonate, alkyl aryl sulfate, alkyl aryl sulfonate, polyoxyethylene alkyl ether sulfate, polyoxyethylene alkyl aryl ether sulfate, dialkyl sulfosuccinate, alkyl phosphate, polyoxyethylene alkyl ether phosphate, and polyoxyethylene alkyl aryl ether phosphate.

Examples of the nonionic surfactant include polyoxyethylene alkyl ether, polyoxyethylene alkyl aryl ether, polyoxyethylene aralkyl ether, polyoxyethylene aralkyl aryl ether, polyoxyethylene polyoxypropylene block adducts, and polyoxyethylene sorbitan fatty acid ester. The HLB (hydrophilic lipophilic balance) of the nonionic surfactant is preferably 6 to 20, more preferably 8 to 19. A surfactant having an HLB of 8 to 12 and a surfactant having an HLB of 16 to 19 may be used in combination.

The use of a surfactant having a branch in the hydrophobic group portion that is constituted by the alkyl group, the alkenyl group or the like is preferable. The reason is that this may have a good influence on the "encapsulation" of the liquid crystal material.

It should be noted that the surfactant is not limited to the above description, and for example, a cationic surfactant or an amphoteric surfactant may be used in combination with the above-exemplified surfactants.

The amount of the surfactant to be used normally may be 0.1 to 15 parts by mass with respect to 100 parts by mass of the monomer group.

In the emulsion polymerization, a polymeric protective colloid agent may be used in addition to the surfactant. Examples of the polymeric protective colloid agent include polyvinyl alcohol (PVA), polyvinylpyrrolidone (PVP), methylcellulose (MC), hydroxyethylcellulose (HEC), hydroxypropylcellulose (HPC), hydroxypropylmethylcellulose (HPMC), starch, polyethylene glycol (PEG), and polyacrylic acid (PAA).

It should be noted that the surfactant and the polymeric protective colloid agent may be added to the emulsion partially after the emulsion polymerization.

A polymerization initiator also is not specifically limited. Examples of the polymerization initiator include inorganic peroxide compounds such as ammonium persulfate, sodium persulfate, potassium persulfate, and hydrogen peroxide; organic compounds such as t-butyl hydroperoxide, and cumene hydroperoxide; and azo compounds such as 2,2'-azobis[2-methyl-N-(2-hydroxyethyl)-propionamide], 2,2'-azobis{2-methyl-N-[2-(1-hydroxybutyl)]-propionamide}, 2,2'-azobis[N-(2-carboxyethyl)-2-methyl-propionamidine], and 2,2'-azobis(2-amidinopropane) dihydrochloride. When using a peroxide compound, redox polymerization may be performed by using, in combination, a reductant such as sodium bisulfite, sodium thiosulfate, sodium tartrate, and sodium ascorbate.

The amount of the polymerization initiator to be used normally may be 0.01 to 5.0 parts by mass with respect to 100 parts by mass of the monomer group.

An open chain transfer agent may be used for controlling the molecular weight of the copolymer, as needed. Examples of the chain transfer agent include mercaptans, lower alcohols, alpha-methylstyrene dimers, carbon halides, and hydrocarbon halides.

Furthermore, a pH adjuster, a pH buffer, a defoamer, a film forming aid, a coalescing agent, a plasticizer, a viscosity modifier, an antifreezing agent, a preservative, a tackifier, an antioxidant, an ultraviolet absorber and the like may be used, as needed.

The polymerization temperature of the emulsion polymerization is, for example, 30 to 100° C., preferably 60 to 85° C.

The emulsion to be obtained by the step a) is an aqueous polymer emulsion. The term aqueous herein is intended to mean that a small amount of an organic solvent can be tolerated. An aqueous polymer emulsion has good handleability and no adverse effects on the environment. The concentration, viscosity, and particle size of the polymer emulsion are not specifically limited, but may be, for example, 20 to 70%, 10 to 1000 mPa·s, and 0.01 to 5 µm, respectively.

Next, the step b) is described. In the step b), a liquid crystal-resin composite material (liquid crystal emulsion) including a copolymer with liquid crystal microparticles being dispersed is prepared from a raw material obtained by adding a liquid crystal material and other necessary materials to the above-obtained polymer emulsion.

As the liquid crystal material, known liquid crystals such as nematic liquid crystals, cholesteric liquid crystals, smectic liquid crystals and the like can be used.

The nematic liquid crystals are used preferably. The birefringence $\Delta n$ of the liquid crystal material is preferably in the range of 0.08 to 0.14. The birefringence $\Delta n$ less than 0.08 may cause a reduction in the shielding property with no voltage applied. The birefringence $\Delta n$ over 0.14 may cause a reduction in the transparency with a voltage applied.

In order to form the desired liquid crystal microparticles, a liquid crystal material is stirred in water in advance to form liquid crystal microparticles, which then is mixed with the emulsion obtained in the step a). Alternatively, it also is possible to form the liquid crystal microparticles by putting the liquid crystal material directly into a polymer emulsion and stirring it. For the uniformity of the shape and particle size of the liquid crystal microparticles, a surfactant may be added thereto as an emulsifier. As the surfactant, a nonionic surfactant is preferable, and a nonionic surfactant having an HLB of 8 to 18, particularly an HLB of 10 to 16, is more preferable.

The mixing or stirring in the above description may be performed using a homogenizer, a homomixer, a disperser, a high-pressure emulsifier, a blender, a colloid mill, and an ultrasonic emulsifier, for example.

An emulsion (liquid crystal emulsion) in which liquid crystal microparticles are dispersed is thus prepared.

The median particle size D50 of the liquid crystal microparticles is preferably in the range of 1.5 to 4.5 µm. When the median particle size D50 exceeds 4.5 µm, the surface area of the liquid crystal microparticles per unit mass decreases and the shielding property with no voltage applied decreases. On the other hand, when the median particle size D50 is less than 1.5 µm, the surface area of the liquid crystal microparticles per unit mass increases, but the transmission and diffraction effects on the long wavelength side in the visible range exceed the increase of the light scattering effects due to the above surface area increase. For this reason, the shielding property with no voltage applied consequently decreases in this case.

In order to achieve the desired optical performance, it is desirable to adjust not only the median particle size of the liquid crystal microparticles (liquid crystal capsules) but also the particle size distribution within an appropriate range. An increase in the ratio of particles of large size causes the scattering in the visible range to almost disappear, and thus the shielding property with no voltage applied decreases. Accordingly, the ratio (D90/D10) of the liquid crystal capsule size D10 at which the cumulative transmittance in the cumulative curve of the liquid crystal capsule size reaches 10% and the liquid crystal capsule size D90 at which the cumulative transmittance reaches 90% preferably falls within the range of $D90/D10 \leqq 3 \times D50$. More preferably, it satisfies $D90/D10 \leqq 2.5 \times D50$.

The median particle size D50 and particle size distribution of the liquid crystal microparticles can be controlled by adjusting the speed and time of stirring. It should be noted that a value measured by a laser diffraction method is employed as the particle size of each of the liquid crystal microparticles in this description.

The mass ratio (liquid crystal ratio V1) of the liquid crystal material to be included in the liquid crystal emulsion is preferably 0.4 to 0.9. The liquid crystal ratio V1 is the mass ratio of the liquid crystal material with respect to the total mass, except for water in the emulsion, of the liquid crystal material, the copolymer and other components (to be added if necessary) such as a crosslinking agent. The liquid crystal ratio V1 affects the optical properties of the liquid crystal-resin composite and the mechanical strength of the liquid crystal microparticles. If the liquid crystal ratio V1 is less than 0.4, the amount of the liquid crystal microparticles falls short in the production of the liquid crystal light control device, and thus the shielding property with no voltage applied decreases. On the other hand, if the liquid crystal ratio V1 exceeds 0.9, the ratio of the copolymer with respect to the liquid crystal material decreases, which makes the shape retention of the liquid crystal microparticles difficult. In such a view, the liquid crystal ratio V1 is more preferably at least 0.5, and it may be set to not more than 0.8.

The introduction of a crosslinked structure into the copolymer by using the monomer C and a crosslinking agent capable of reacting with the monomer C is useful, as well as the introduction of an nonionic hydrophilic group, for allowing the copolymer including the monomer A as the main monomer to become suitable for use as the resin matrix of the liquid crystal light control device. When a crosslinked structure is to be introduced into the copolymer, a crosslinking agent may be added to the liquid crystal emulsion before the liquid crystal emulsion is disposed on the conductive film-coated substrate by coating application or the like in the next step. As the crosslinking agent, one capable of reacting with the functional group included in the copolymer, particularly with a carboxyl group and/or an amino group that has been introduced by the monomer C, is to be selected.

Examples of the crosslinking agent include epoxy compounds such as ethylene glycol diglycidyl ether, polyethylene glycol diglycidyl ether, propylene glycol diglycidyl ether, polypropylene glycol diglycidyl ether, glycerol diglycidyl ether, polyglycerol polyglycidyl ether, and diglycidylaniline; epoxy silane compounds such as gamma-glycidoxypropyltrimethoxysilane, gamma-glycidoxypropyltriethoxysilane, gamma-glycidoxypropyldimethoxymethylsilane, gamma-glycidoxypropyldiethoxymethylsilane, beta-(3,4-epoxycyclohexyl)ethyltrimethoxysilane, and beta-(3,4-epoxycyclohexyl)ethyltriethoxysilane; aminosilane compounds such as 3-aminopropyltrimethoxysilane, 3-aminopropyltriethoxysilane, N-(2-aminoethyl)-3-aminopropyltrimethoxysilane, and N-(2-aminoethy)-3-aminopropylmethyldimethoxysilane; mercaptosilane compounds such as gamma-mercaptopropyltrimethoxysilane; hydrazide compounds such as carbodihydrazide, oxalic acid dihydrazide, adipic acid dihydrazide, sebacic acid dihydrazide, and isophthalic acid dihydrazide; semicarbazide resins; polycarbodiimide resins; aziridine (ethyleneimine group-containing) compounds such as tetramethylolmethane-tris-(beta-aziridinylpropionate), trimethylolpropane-tris-(beta-aziridinylpropionate), methylenebis[N-(1-aziridinylcarbonyl)-4-aniline], N,N'-hexamethylenebis(1-aziridinecarboxamide), and N,N'-hexaaminoethylene-1,6-bis(1-aziridinecarboxamide); acetoacetoxy group-containing compounds; oxazoline group-containing compounds; polyethylenepolyamine; polyethyleneimine; polyamide polyamine; polyamidepolyurea; alkylated polymethylol melamine; glyoxal; and blocked isocyanate.

The amount of the crosslinking agent to be added is not specifically limited, but normally not more than 20 parts by mass, preferably not more than 10 parts by mass, with respect to 100 parts by mass of the monomer group.

An example of characteristic structures to be formed by the reaction between a carboxyl group and a crosslinking agent is illustrated below. It should be noted that the description below is no more than an example and there is no intention to limit the types of crosslinked structures. A structure indicated in the following formula (2) is formed by the reaction between a carboxyl group and a crosslinking agent having an ethyleneimine group.

Formula 2:

—C(=O)—O—CH$_2$CH$_2$—NH— (2)

A structure indicated in the following formula (3) is formed by the reaction between a carboxyl group and a crosslinking agent having a carbodiimide group.

Formula 3:

(3)

A structure indicated in the following formula (4) is formed by the reaction between a carboxyl group and a crosslinking agent having an epoxy group.

Formula 4:

—C(=O)—O—CH$_2$CH(—OH)— (4)

The copolymer may have a crosslinked structure including at least one structure selected from the above-mentioned structures.

In the step c), the emulsion (liquid crystal emulsion) that has been turned into the liquid crystal-resin composite material is disposed on the conductive film of the conductive film-coated substrate.

The conductive film of the conductive film-coated substrate may be a transparent conductive film represented by ITO (indium tin oxide) and tin oxide. As the substrate formed with the conductive film on its surface, transparent substrates such as resin films, glass sheets and the like, particularly PET (polyethylene terephthalate) films, are preferable. The formation of the conductive film may be performed by a known process such as sputtering, CVD (Chemical Vapor Deposition), and printing.

The liquid crystal emulsion can be disposed on the conductive film by a coating application using a known device such as a blade knife coater, a bar coater, an air knife coater, a microgravure roll coater, a reverse roll coater, a kiss roll coater, a dip roll coater, a curtain coater, a spin coater, and a spray coater.

The liquid crystal emulsion thus applied may be dried to remove excess water. In the case of the addition of a crosslinking agent, a crosslinked structure is introduced into the copolymer with drying. The drying of the emulsion may be performed at room temperature or under heating for enhancing the drying.

When a crosslinked structure is to be introduced, the liquid crystal emulsion (liquid crystal-resin composite material) including a crosslinking agent is applied onto the conductive film in the step c) as mentioned above, and after the step c), a crosslinked structure may be introduced into the copolymer by the crosslinking agent. In this case, the monomer group may be allowed further to contain the monomer C having a functional group that is a carboxyl group and/or an amino group, and a crosslinking agent capable of forming a crosslinked structure by reacting with the above-mentioned functional group included in the monomer C may be used.

The liquid crystal-resin composite formed into a film by applying the liquid crystal emulsion preferably has a thickness of 10 to 35 μm, particularly 15 to 25 μm, considering the balance between the transparency and shielding property of the liquid crystal light control device.

In the step d), another conductive film-coated substrate is disposed on the liquid crystal-resin composite that has been formed on the first conductive film. Thus, a liquid crystal light control device in which the liquid crystal-resin composite is sandwiched between the two conductive film-coated substrates in contact with these conductive films is produced.

The same conductive film-coated substrate as one described in the step c) may be used also for the other conductive film-coated substrate to be used in this step. This substrate is laminated to the liquid crystal-resin composite to be integrated with the first conductive film-coated substrate and the liquid crystal-resin composite. It is preferable that the conductive film-coated substrate is laminated directly to the liquid crystal-resin composite, in other words, it is laminated thereto without the interposition of other materials.

In the present invention, since the glass transition temperature of the copolymer is set so as not to be excessively high, the step c) and step d) can be performed at around room temperature, for example, under an atmosphere at a temperature of 20 to 30° C.

FIG. 1 illustrates a cross section of the liquid crystal light control device as an example.

A liquid crystal light control device 30 indicated in FIG. 1 includes a liquid crystal-resin composite 10 in which liquid crystal microparticles 2 are dispersed in a resin matrix 3. In the device 30, the liquid crystal-resin composite 10 is sandwiched between two conductive film-coated substrates 6. Both of the conductive films 5 of the conductive film-coated substrates 6 are disposed in contact with the liquid crystal-resin composite 10. In the illustrated state, no voltage is applied between the conductive films 5, and liquid crystal molecules 1 constituting the liquid crystal microparticles 2 each have a random orientation. In such a state where no voltage is applied, the light incident on the liquid crystal light control device 30 is scattered considerably, so that the opposite side cannot be visually recognized through the device 30. Upon the supply of a voltage between the conductive films 5 from a power source, which is not illustrated in the FIGURE, the liquid crystal molecules 1 are aligned along the direction of the applied voltage. In such a state where a voltage is applied, the scattering of the light incident on the liquid crystal light control device 30 decreases. Thus, the opposite side can be seen through the device 30.

EXAMPLES

Hereinafter, the present invention will be described further in detail by way of Examples and Comparative Examples. It should be noted that all the part(s) and % below are expressed by mass.

Polymerization Example 1

55 parts of ion-exchanged water and 1 part of sodium polyoxyalkylene isodecyl ether sulfate (30% aqueous solution) were put into a separable flask equipped with a condenser, a nitrogen inlet tube, a thermometer, a stirrer, and a dropping funnel. Then, the temperature thereof was increased to 80° C. under stirring. Next, 2 parts of a 10% aqueous solution of ammonium persulfate was added thereto under a nitrogen atmosphere. After 5 minutes, a mixture of monomers and others of 60 parts of butyl acrylate, 35 parts of butyl methacrylate, 4 parts of 2-hydroxyethyl acrylate, 1 part of acrylic acid, 3 parts of polyoxyethylene isodecyl ether and 40 parts of ion-exchanged water was dropped therein through the dropping funnel over 4 hours. Further, simultaneously with the start of the addition of this mixture, 6 parts of a 3% aqueous solution of ammonium persulfate was dropped therein over 4 hours. The temperature further was increased to 85° C. followed by stirring for 2 hours, which then was cooled to 30° C. Finally, the pH and concentration were adjusted by adding ammonia water and ion-exchanged water thereto. The thus obtained polymer emulsion had a non-volatile content of 49.2%, a viscosity of 970 mPa·s, a pH of 8.2, and a particle size of 0.19 μm.

It should be noted that the non-volatile content of the polymer emulsion was calculated by measuring the evaporation residue after 1 hour in a thermostat bath at 105° C., the viscosity thereof was determined by a Brookfield rotational viscometer (Model BM manufactured by TOKI SANGYO CO., LTD.) under conditions at 23° C. and at 0.5 cycle per second (30 rpm), the pH thereof was measured by a pH meter (F-22 manufactured by HORIBA, Ltd.) at room temperature, and the particle size thereof was determined by a dynamic light scattering particle size distribution analyzer (FPAR-1000 manufactured by Otsuka Electronics Co., Ltd.) using an average particle size resulted from an analysis by the cumulant method.

Polymerization Example 2

Emulsion polymerization was performed in the same manner as in Polymerization Example 1 except that the monomers and surfactants were changed to those indicated in Table 1. Thus, a polymer emulsion having a non-volatile content of 47.1%, a viscosity of 410 mPa·s, a pH of 7.8, and a particle size of 0.17 μm was obtained.

Polymerization Example 3

Emulsion polymerization was performed in the same manner as in Polymerization Example 1 except that the monomers and surfactants were changed to those indicated in Table 1. Thus, a polymer emulsion having a non-volatile content of 48.0%, a viscosity of 520 mPa·s, a pH of 7.5, and a particle size of 0.30 μm was obtained.

Polymerization Example 4

55 parts of ion-exchanged water, 0.3 part of sodium hydrogencarbonate and 0.1 part of disodium hydrogenphosphate were put into a separable flask equipped with a condenser, a nitrogen inlet tube, a thermometer, a stirrer, and a dropping funnel. Then, the temperature thereof was increased to 75° C. under stirring. Next, 2 parts of a 10% aqueous solution of potassium persulfate was added thereto under a nitrogen atmosphere. After 5 minutes, a mixture of monomers and others of 30 parts of methyl methacrylate, 40 parts of cyclohexyl acrylate, 27.5 parts of 2-ethylhexyl acrylate, 2 parts of N-methylolacrylamide, 0.5 part of acrylic acid, 2.9 parts of polyoxyethylene branched alkyl (C11 to 13) ether (70% aqueous solution), 0.29 part of sodium bis(2-ethylhexyl) sulfosuccinate (75% aqueous solution), and 40 parts of ion-exchanged water was dropped therein through the dropping funnel over 4 hours. Further, simultaneously with the start of the addition of this mixture, 6 parts of a 3% aqueous solution of ammonium persulfate was dropped therein over 4 hours. The temperature further was increased to 80° C. followed by stirring for 2 hours, which then was cooled to 30° C. Finally, the pH and concentration were adjusted by adding ammonia water and ion-exchanged water thereto. The thus obtained polymer emulsion had a non-volatile content of 50.1%, a viscosity of 1650 mPa·s, a pH of 8.5, and a particle size of 0.27 μm.

Polymerization Example 5

55 parts of ion-exchanged water, 1 part of polyoxyethylene isotridecyl ether and 0.5 part of sodium hydrogencarbonate were put into a separable flask equipped with a condenser, a nitrogen inlet tube, a thermometer, a stirrer, and a dropping funnel. Then, the temperature thereof was increased to 70° C. under stirring. Next, 2 parts of a 10% aqueous solution of 2,2'-azobis(2-amidinopropane) dihydrochloride was added thereto under a nitrogen atmosphere. After 15 minutes, a mixture of monomers and others of 53 parts of butyl acrylate, 43 parts of dicyclopentanyl methacrylate, 1 part of 2-hydroxyethyl acrylate, 1 part of methacrylic acid, 1 part of N,N-dimethylaminoethyl methacrylate, 1 part of 3-methacryloyloxypropyltrimethoxysilane, 3 parts of polyoxyethylene isotridecyl ether and 40 parts of ion-exchanged water was dropped therein through the dropping funnel over 4 hours. Further, simultaneously with the start of the addition of this mixture, 6 parts of a 3% aqueous solution of 2,2'-azobis(2-amidinopropane) dihydrochloride was dropped therein over 5 hours. The temperature further was increased to 75° C. followed by stirring for 3 hours, which then was cooled to 30° C. Finally, the pH and concentration were adjusted by adding ammonia water and ion-exchanged water thereto. The thus obtained polymer emulsion had a non-volatile content of 49.9%, a viscosity of 330 mPa·s, a pH of 7.6, and a particle size of 1.20 µm.

Polymerization Example 6

Emulsion polymerization was performed in the same manner as in Polymerization Example 1 except that the monomers and surfactants were changed to those indicated in Table 1. Thus, a polymer emulsion having a non-volatile content of 46.2%, a viscosity of 1100 mPa·s, a pH of 7.2, and a particle size of 0.22 µm was obtained.

Comparative Polymerization Example 1

Emulsion polymerization was performed in the same manner as in Polymerization Example 1 except that the monomers and surfactants were changed to those indicated in Table 1. Thus, a polymer emulsion having a non-volatile content of 49.8%, a viscosity of 210 mPa·s, a pH of 8.5, and a particle size of 0.31 µm was obtained.

Comparative Polymerization Example 2

Emulsion polymerization was performed in the same manner as in Polymerization Example 1 except that the monomers and surfactants were changed to those indicated in Table 1. Thus, a polymer emulsion having a non-volatile content of 50.0%, a viscosity of 120 mPa·s, a pH of 7.4, and a particle size of 1.80 µm was obtained.

Comparative Polymerization Example 3

Emulsion polymerization was performed in the same manner as in Polymerization Example 1 except that the monomers and surfactants were changed to those indicated in Table 1. Thus, a polymer emulsion having a non-volatile content of 40.0%, a viscosity of 290 mPa·s, a pH of 5.2, and a particle size of 0.19 µm was obtained.

Comparative Polymerization Example 4

Emulsion polymerization was performed in the same manner as in Polymerization Example 1 except that the monomers and surfactants were changed to those indicated in Table 1. Thus, a polymer emulsion having a non-volatile content of 46.9%, a viscosity of 630 mPa·s, a pH of 8.0, and a particle size of 0.20 µm was obtained.

The glass transition temperature (Tg) in each of Polymerization Examples 1 to 6, Comparative Polymerization Examples 1 to 4 and the urethane emulsion for comparison was measured as follows. First, a film sample was obtained by putting about 3 g of a polymer emulsion in a 5 cm diameter Teflon™ Petri dish followed by drying at 105° C. for 3 hours. This was weighed to about 10 mg in a cylindrical aluminum pan with a thickness of about 0.05 mm, an internal diameter of about 5 mm, and a height of about 5 mm to obtain a measurement sample, which was measured by a differential scanning calorimeter (DSC6220 manufactured by SII NanoTechnology Inc.) at a temperature increase rate of 10° C. per minute from −110° C. to +250° C. Table 1 indicates the measurement results.

Next, a liquid crystal emulsion (liquid crystal-resin composite material) and a liquid crystal light control device were produced using each of the polymer emulsions obtained in the Polymerization Examples 1 to 6, the polymer emulsions obtained in Comparative Polymerization Examples 1 to 4 and the urethane emulsion for comparison.

Example 1

The polymer emulsion obtained in the above-mentioned Polymerization Example 1 was diluted in water to a non-volatile content of 40%. Then, with respect to 100 parts of the diluted polymer emulsion, 64 parts of a nematic liquid crystal (birefringence $\Delta n=0.132$, JM1000XX manufactured by Chisso Corporation) was added thereto. This emulsion was stirred using an Excel Auto Homogenizer (manufactured by NISSEI Corporation) at a rotation rate of 133.3 cycles per second (8000 rpm) for 10 minutes. Thus, a liquid crystal emulsion was obtained. The liquid crystal microparticles (liquid crystal capsules) of this liquid crystal emulsion were measured for each particle size using a laser diffraction particle size analyzer (SALD-1100 manufactured by SHIMADZU CORPORATION). As a result, the median particle size D50 of the liquid crystal capsules was 2.5 µm.

It should be noted that the measurement of the particle size distribution using the SALD-1100 was performed under the conditions of a measurement range: 0.1 to 45 µm (A1), a corresponding refractive index: 1.6 to 0.1, the number of sampling: 5 times, and a calculation method: D (Direct).

Subsequently, a 50% aqueous solution of a crosslinking agent was prepared by dissolving, in water, polypropylene glycol diglycidyl ether serving as a crosslinking agent. While stirring the thus obtained liquid crystal emulsion at low speed, the above-mentioned aqueous solution of the crosslinking agent was added to the liquid crystal emulsion. The addition ratio of the aqueous solution of the crosslinking agent was 4.8 parts of the aqueous solution of the crosslinking agent with respect to 100 parts of the polymer emulsion included in the liquid crystal emulsion (100 parts of polymer emulsion diluted with water). The liquid crystal ratio V1 in the thus obtained liquid crystal emulsion for film formation was 0.60.

Next, the liquid crystal emulsion was applied onto an ITO film-coated PET film using a doctor blade coater, followed by drying. Thus, a liquid crystal-resin composite was formed on the PET film. A liquid crystal light control device was obtained by laminating, to another ITO-coated PET film, this PET film formed with the liquid crystal-resin composite thereon. The application of the liquid crystal emulsion and the lamination of the PET film to the liquid crystal-resin composite were performed entirely under an atmosphere at about 22° C.

The thickness of the liquid crystal-resin composite was calculated by measuring the thickness of the liquid crystal light control device using a micrometer (manufactured by MITUTOYO CORPORATION) and subtracting the total thickness of the two PET films from the thus measured value. The thickness of the liquid crystal-resin composite was 20 µm. The formation state of the liquid crystal microparticles (liquid crystal capsules) was observed using a real surface view microscope (VE-7800 manufactured by KEYENCE CORPORATION). As a result, it was confirmed that the liquid crystal capsules each had a good spherical shape.

The haze ratios of the thus obtained liquid crystal light control device with no voltage applied and with a voltage applied each were measured using a haze meter (HGM-2DP manufactured by Suga Test Instruments Co., Ltd.). Here, a sine waveform voltage with a voltage of 100 V at a frequency of 50 Hz was used for the voltage application. The higher the haze ratio, the higher the shielding property (the transparency decreases). The lower the haze ratio, the higher the transparency (the shielding property decreases). The liquid crystal light control device had a haze ratio of 93.8% with no voltage applied, and a haze ratio of 6.5% with a voltage applied.

Example 2

A liquid crystal light control device was produced in the same manner as in Example 1 except that a crosslinking agent indicated in Table 2 was used instead of the crosslinking agent used in Example 1.

The median diameter D50 of liquid crystal microparticles (liquid crystal capsules) in a liquid crystal emulsion produced in the same manner as in Example 1 was 2.3 µm. A 10% aqueous solution of the crosslinking agent was prepared by dissolving, in water, N,N'-hexaaminoethylene-1,6-bis(1-aziridine carboxyamide) serving as a crosslinking agent. While stirring, at low speed, a liquid crystal emulsion including 100 parts of a polymer emulsion that had been diluted to a non-volatile content of 40%, the aqueous solution of the crosslinking agent was added thereto at a ratio of 32 parts with respect to the liquid crystal emulsion. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 µm, and the liquid crystal capsules having a good spherical shape were observed. The liquid crystal light control device had a haze ratio of 94.2% with no voltage applied, and a haze ratio of 7.0% with a voltage applied.

Example 3

A liquid crystal light control device was produced in the same manner as in Example 1 except that the polymer emulsion of Polymerization Example 2 was used instead of the polymer emulsion of Polymerization Example 1 used in Example 1 and a crosslinking agent indicated in Table 2 was used as follows.

The median diameter D50 of liquid crystal microparticles (liquid crystal capsules) in a liquid crystal emulsion produced in the same manner as in Example 1 was 2.7 µm. A 50% aqueous solution of the crosslinking agent was prepared by dissolving, in water, an aziridine compound serving as a crosslinking agent. While stirring, at low speed, a liquid crystal emulsion including 100 parts of a polymer emulsion that had been diluted to a non-volatile content of 40%, the aqueous solution of the crosslinking agent was added thereto at a ratio of 3.2 parts with respect to the liquid crystal emulsion. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 µm, and the liquid crystal capsules having a good spherical shape were observed. The liquid crystal light control device had a haze ratio of 94.1% with no voltage applied, and a haze ratio of 6.8% with a voltage applied.

Example 4

A liquid crystal light control device was produced in the same manner as in Example 1 except that the polymer emulsion of Polymerization Example 3 was used instead of the polymer emulsion of Polymerization Example 1 used in Example 1 and a crosslinking agent indicated in Table 2 was used as follows.

The median diameter D50 of liquid crystal microparticles (liquid crystal capsules) in a liquid crystal emulsion produced in the same manner as in Example 1 was 2.5 µm. A 50% aqueous solution of the crosslinking agent was prepared by dissolving, in water, adipic acid dihydrazide serving as a crosslinking agent. While stirring, at low speed, a liquid crystal emulsion including 100 parts of a polymer emulsion that had been diluted to a non-volatile content of 40%, the aqueous solution of the crosslinking agent was added thereto at a ratio of 0.8 part with respect to the liquid crystal emulsion. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 µm, and the liquid crystal capsules having a good spherical shape were observed. The liquid crystal light control device had a haze ratio of 94.4% with no voltage applied, and a haze ratio of 7.5% with a voltage applied.

Example 5

A liquid crystal light control device was produced in the same manner as in Example 1 except that the polymer emulsion of Polymerization Example 4 was used instead of the polymer emulsion of Polymerization Example 1 used in Example 1 and a crosslinking agent was not used.

The median diameter D50 of liquid crystal microparticles (liquid crystal capsules) in a liquid crystal emulsion produced in the same manner as in Example 1 was 2.8 µm. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 µm, and the liquid crystal capsules having a good spherical shape were observed. The liquid crystal light control device had a haze ratio of 93.4% with no voltage applied, and a haze ratio of 8.1% with a voltage applied.

Example 6

A liquid crystal light control device was produced in the same manner as in Example 1 except that the polymer emulsion of Polymerization Example 5 was used instead of the polymer emulsion of Polymerization Example 1 used in Example 1 and a crosslinking agent was not used.

The median diameter D50 of liquid crystal microparticles (liquid crystal capsules) in a liquid crystal emulsion produced in the same manner as in Example 1 was 3.0 µm. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 µm, and the liquid crystal capsules having a good spherical shape were observed. The liquid crystal light control device had a haze ratio of 93.1% with no voltage applied, and a haze ratio of 8.3% with a voltage applied.

Example 7

A liquid crystal light control device was produced in the same manner as in Example 1 except that the polymer emulsion of Polymerization Example 6 was used instead of the polymer emulsion of Polymerization Example 1 used in Example 1 and a crosslinking agent indicated in Table 2 was used as follows.

The median diameter D50 of liquid crystal microparticles (liquid crystal capsules) in a liquid crystal emulsion produced in the same manner as in Example 1 was 2.5 µm. A 50% aqueous solution of the crosslinking agent was prepared by dissolving, in water, a polycarbodiimide resin serving as a crosslinking agent. While stirring, at low speed, a liquid crystal emulsion including 100 parts of a polymer emulsion that had been diluted to a non-volatile content of 40%, the aqueous solution of the crosslinking agent was added thereto at a ratio of 2.4 parts with respect to the liquid crystal emulsion. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 µm, and the liquid crystal capsules having a good spherical shape were observed. The liquid crystal light control device had a haze ratio of 94.0% with no voltage applied, and a haze ratio of 8.5% with a voltage applied.

Comparative Example 1

A liquid crystal light control device was produced in the same manner as in Example 1 except that the polymer emulsion of Comparative Polymerization Example 1 was used instead of the polymer emulsion of Polymerization Example 1 used in Example 1.

Although a liquid crystal emulsion was produced in the same manner as in Example 1, the formation state of liquid crystal microparticles (liquid crystal capsules) was poor and thus the measurement of the particle size thereof was impossible. A 50% aqueous solution of a crosslinking agent was prepared by dissolving, in water, polypropylene glycol diglycidyl ether serving as the crosslinking agent. While stirring, at low speed, a liquid crystal emulsion including 100 parts of a polymer emulsion that had been diluted to a non-volatile content of 40%, the aqueous solution of the crosslinking agent was added thereto at a ratio of 4.8 parts with respect to the liquid crystal emulsion. The liquid crystal ratio V1 in the obtained liquid crystal emulsion of the film formation solution was 0.60. Thereafter, a liquid crystal light control device was produced in the same manner as in Example 1. Although the thickness of the obtained liquid crystal-resin composite was 20 µm, the state of the liquid crystal capsules was significantly poor and no spherical shaped liquid crystal capsules were formed. Therefore, the use for a liquid crystal light control device was impossible.

Comparative Example 2

A liquid crystal light control device was produced in the same manner as in Example 1 except that the polymer emulsion of Comparative Polymerization Example 2 was used instead of the polymer emulsion of Polymerization Example 1 used in Example 1 and a crosslinking agent was not used.

Although a liquid crystal emulsion was produced in the same manner as in Example 1, the formation state of liquid crystal microparticles (liquid crystal capsules) was poor and thus the measurement of the particle size thereof was impossible. The liquid crystal ratio V1 in the obtained liquid crystal emulsion for film formation was 0.60. Thereafter, a liquid crystal light control device was produced in the same manner as in Example 1. However, a uniform coating film was not formed in the step of the application of the liquid crystal emulsion on the PET film and drying thereof, thus failing to obtain a liquid crystal-resin composite itself. Specifically, the liquid crystal capsules could not be maintained in the resin matrix and were allowed to precipitate on the surface of the coating film. This is possibly because of an excessively high glass transition temperature of the copolymer in the resin matrix.

Comparative Example 3

A liquid crystal light control device was produced in the same manner as in Example 1 except that the polymer emulsion of Comparative Polymerization Example 3 was used instead of the polymer emulsion of Polymerization Example 1 used in Example 1 and a crosslinking agent indicated in Table 2 was used as follows.

The median diameter D50 of liquid crystal microparticles (liquid crystal capsules) in a liquid crystal emulsion produced in the same manner as in Example 1 was 4.6 µm. A 50% aqueous solution of the crosslinking agent was prepared by dissolving, in water, an aziridine compound serving as a crosslinking agent. While stirring, at low speed, a liquid crystal emulsion including 100 parts of a polymer emulsion that had been diluted to a non-volatile content of 40%, the aqueous solution of the crosslinking agent was added thereto at a ratio of 3.2 parts with respect to the liquid crystal emulsion. The liquid crystal ratio V1 in the obtained liquid crystal emulsion for film formation was 0.60. Thereafter, a liquid crystal light control device was produced in the same manner as in Example 1. However, as is the case of Comparative Example 2, a uniform coating film was not formed in the steps of the application of the liquid crystal emulsion on the PET film and drying thereof, thus failing to obtain a liquid crystal-resin composite itself.

Comparative Example 4

A liquid crystal-resin composite and a liquid crystal light control device were produced in the same manner as in Example 1 except that the polymer emulsion of Comparative Polymerization Example 4 was used instead of the polymer emulsion of Polymerization Example 1 used in Example 1 and a crosslinking agent indicated in Table 2 was used as follows.

The median diameter D50 of liquid crystal microparticles (liquid crystal capsules) in a liquid crystal emulsion produced in the same manner as in Example 1 was 6.5 µm. A 50% aqueous solution of the crosslinking agent was prepared by dissolving, in water, an aziridine compound serving as a crosslinking agent. While stirring, at low speed, a liquid crystal emulsion including 100 parts of a polymer emulsion that had been diluted to a non-volatile content of 40%, the aqueous solution of the crosslinking agent was added thereto at a ratio of 3.2 parts with respect to the liquid crystal emulsion. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 µm. However, the state of liquid crystal capsules was not good, and spherical shaped liquid crystal capsules were not formed sufficiently. The liquid crystal light control device had a haze ratio of 60.1% with no voltage applied, and a haze ratio of 21.0% with a voltage applied.

Comparative Example 5

A liquid crystal-resin composite and a liquid crystal light control device were produced in the same manner as in Example 1 except that the polyurethane emulsion was used instead of the polymer emulsion of Polymerization Example 1 used in Example 1.

The median diameter D50 of liquid crystal microparticles (liquid crystal capsules) in a liquid crystal emulsion produced in the same manner as in Example 1 was 2.7 μm. A 50% aqueous solution of the crosslinking agent was prepared by dissolving, in water, polypropylene glycol diglycidyl ether serving as a crosslinking agent. While stirring, at low speed, a liquid crystal emulsion including 100 parts of the 40% polyurethane emulsion, the aqueous solution of the crosslinking agent was added thereto at a ratio of 4.8 parts with respect to the liquid crystal emulsion. The liquid crystal ratio V1 in the obtained liquid crystal emulsion for film formation was 0.60. Thereafter, a liquid crystal light control device was produced in the same manner as in Example 1. The thickness of the obtained liquid crystal-resin composite was 20 μm, and the liquid crystal microparticles having a relatively good spherical shape were observed. The liquid crystal light control device had a haze ratio of 92.7% with no voltage applied, and a haze ratio of 13.9% with a voltage applied.

TABLE 1

COMPOSITION TABLE OF POLYMER EMULSION

| | MONOMER COMPONENTS | Tg (° C.) | SURFACTANT |
|---|---|---|---|
| POLYMERIZATION EXAMPLE 1 | BA/BMA/HEA/AA = 60/35/4/1<br>MONOMER RATIO A 95($A_1$ 95)/B 4/C 1 | −30 | DE: 3.0<br>DES: 0.3 |
| POLYMERIZATION EXAMPLE 2 | MMA/BA/AAm/MAA = 30/65/1/4<br>MONOMER RATIO A 95($A_1$ 95)/B 1/C 4 | −16 | TDE: 1.0<br>TDES: 1.0 |
| POLYMERIZATION EXAMPLE 3 | BMA/2EHA/DAAM/MaA = 53/45.5/1/0.5<br>MONOMER RATIO A 98.5($A_1$ 98.5)/B 1/C 0.5 | −39 | ER: 2.5<br>KH: 1.0 |
| POLYMERIZATION EXAMPLE 4 | MMA/CHA/2EHA/N-MAM/AA = 30/40/27.5/2/0.5<br>MONOMER RATIO A 97.5($A_1$ 57.5/$A_2$40)/B 2/C 0.5 | −3 | AE: 2.0<br>DASS: 0.2 |
| POLYMERIZATION EXAMPLE 5 | BA/DCPMA/HEA/MAA/DMAEMA/TMSMA = 53/43/1/1/1/1<br>MONOMER RATIO A 96($A_1$ 53/$A_2$43)/B 1/C 1/D 2 | +12 | TDE: 3.0 |
| POLYMERIZATION EXAMPLE 6 | 2EHA/IBA/HEMA/AA/GMA = 26/60/9/2/3<br>MONOMER RATIO A 86($A_1$ 26/$A_2$60)/B 9/C 2/D 3 | +18 | AE: 2.0<br>DASS: 1.0 |
| COMPARATIVE POLYMERIZATION EXAMPLE 1 | BA/BMA = 61/39<br>MONOMER RATIO A 100 | −30 | DE: 3.0<br>DES: 0.3 |
| COMPARATIVE POLYMERIZATION EXAMPLE 2 | MMA/BA = 70/30<br>MONOMER RATIO A 100 | +37 | LE: 3.0 |
| COMPARATIVE POLYMERIZATION EXAMPLE 3 | MMA/BA/AAm/MAA = 40/30/5/25<br>MONOMER RATIO A 70/B 5/C 25 | +43 | TDE: 1.0<br>TDES: 1.0 |
| COMPARATIVE POLYMERIZATION EXAMPLE 4 | BA/HEA/AA/St = 65/1/4/30<br>MONOMER RATIO A 65/B 1/C 4/D 30 | −16 | TDE: 1.0<br>TDES: 1.0 |
| URETHANE RESIN | POLYURETHANE EMULSION<br>Neorez R-967 (by DSM NeoResins) | −48 | — |

*Values except for Tg(Glass Transition Temperature) are expressed by mass.
The values of surfactants each are the mass ratio (dry mass) with respect to the total mass of monomers.

TABLE 2

TABLE 2: EVALUATION OF LIQUID CRYSTAL-RESIN COMPOSITE

| | POLYMER EMULSION | LIQUID CRYSTAL MICRO-PARTICLE SIZE (μm) | CROSS-LINKING AGENT | LIQUID CRYSTAL RATIO V1 | THICKNESS (μm) | STATE OF LIQUID CRYSTAL CAPSULE |
|---|---|---|---|---|---|---|
| EX. 1 | POLYMERIZATION EXAMPLE 1 | 2.5 | PGDG: 6 | 0.60 | 20 | ◎ |
| EX. 2 | POLYMERIZATION EXAMPLE 1 | 2.3 | HDU: 8 | 0.60 | 20 | ◎ |
| EX. 3 | POLYMERIZATION EXAMPLE 2 | 2.7 | PAC: 4 | 0.60 | 20 | ◎ |
| EX. 4 | POLYMERIZATION EXAMPLE 3 | 2.5 | ADH: 1 | 0.60 | 20 | ◎ |
| EX. 5 | POLYMERIZATION EXAMPLE 4 | 2.8 | — | 0.60 | 20 | ◎ |
| EX. 6 | POLYMERIZATION EXAMPLE 5 | 3.0 | — | 0.60 | 20 | ◎ |
| EX. 7 | POLYMERIZATION EXAMPLE 6 | 2.5 | CDI: 3 | 0.60 | 20 | ◎ |

TABLE 2-continued

TABLE 2: EVALUATION OF LIQUID CRYSTAL-RESIN COMPOSITE

| | POLYMER EMULSION | LIQUID CRYSTAL MICRO-PARTICLE SIZE (μm) | CROSS-LINKING AGENT | LIQUID CRYSTAL RATIO V1 | THICKNESS (μm) | STATE OF LIQUID CRYSTAL CAPSULE |
|---|---|---|---|---|---|---|
| C. EX. 1 | COMPARATIVE POLYMERIZATION EXAMPLE 1 | MEASUREMENT IMPOSSIBLE | PGDG: 6 | 0.60 | 20 | x |
| C. EX. 2 | COMPARATIVE POLYMERIZATION EXAMPLE 2 | MEASUREMENT IMPOSSIBLE | — | 0.60 | 20 | NO UNIFORM FILM OBTAINED |
| C. EX. 3 | COMPARATIVE POLYMERIZATION EXAMPLE 3 | 4.6 | PAC: 4 | 0.60 | 20 | NO UNIFORM FILM OBTAINED |
| C. EX. 4 | COMPARATIVE POLYMERIZATION EXAMPLE 4 | 6.5 | PAC: 4 | 0.60 | 20 | Δ |
| C. EX. 5 | URETHANE RESIN | 2.7 | PGDG: 6 | 0.60 | 20 | ○ |

*The values of crosslinking agents each are the mass ratio (dry mass) with respect to the total mass of monomers.

TABLE 3

TABLE 3: EVALUATION OF LIQUID CRYSTAL LIGHT CONTROL DEVICE

| | LIQUID CRYSTAL-RESIN COMPOSITE MATERIAL | | | LIQUID CRYSTAL LIGHT CONTROL DEVICE HAZE (%) | |
|---|---|---|---|---|---|
| | POLYMER EMULSION | CROSSLINKING AGENT | APPEARANCE | NO VOLTAGE APPLIED | VOLTAGE APPLIED |
| EX. 1 | POLYMERIZATION EXAMPLE 1 | PGDG | ◉ | 93.8 | 6.5 |
| EX. 2 | POLYMERIZATION EXAMPLE 1 | HDU | ◉ | 94.2 | 7.0 |
| EX. 3 | POLYMERIZATION EXAMPLE 2 | PAC | ◉ | 94.1 | 6.8 |
| EX. 4 | POLYMERIZATION EXAMPLE 3 | ADH | ◉ | 94.4 | 7.5 |
| EX. 5 | POLYMERIZATION EXAMPLE 4 | — | ◉ | 93.4 | 8.1 |
| EX. 6 | POLYMERIZATION EXAMPLE 5 | — | ◉ | 93.1 | 8.3 |
| EX. 7 | POLYMERIZATION EXAMPLE 6 | CDI | ◉ | 94.0 | 8.5 |
| C. EX. 1 | COMPARATIVE POLYMERIZATION EXAMPLE 1 | PGDG | x | — | — |
| C. EX. 2 | COMPARATIVE POLYMERIZATION EXAMPLE 2 | — | — | — | — |
| C. EX. 3 | COMPARATIVE POLYMERIZATION EXAMPLE 3 | PAC | — | — | — |
| C. EX. 4 | COMPARATIVE POLYMERIZATION EXAMPLE 4 | PAC | Δ | 60.1 | 21.0 |
| C. EX. 5 | URETHANE RESIN | PGDG | ○ | 92.7 | 13.9 |

Each abbreviation in Tables 1 to 3 is given a meaning as follows.
<Monomer A>
BA: Butyl acrylate
2EHA: 2-ethylhexyl acrylate
MMA: Methyl methacrylate
BMA: Butyl methacrylate
CHA: Cyclohexyl acrylate
DCPMA: Dicyclopentanyl methacrylate
IBA: Isobornyl acrylate
<Monomer B>
HEA: 2-hydroxyethyl acrylate
HEMA: 2-hydroxyethyl methacrylate
AAm: Acrylamide
DAAM: Diacetoneacrylamide
N-MAM: N-methylolacrylamide
<Monomer C>
AA: Acrylic acid
MAA: Methacrylic acid
MaA: Maleic acid
<Monomer D>
GMA: Glycidyl methacrylate
DMAEMA: N,N-dimethylaminoethyl methacrylate
TMSMA: 3-methacryloyloxypropyltrimethoxysilane
<Nonionic Surfactant>
DE: Polyoxyethylene isodecyl ether (HLB=17.9, NOIGEN SD-300 manufactured by Dai-ichi Kogyo Seiyaku Co, Ltd.)
TDE: Polyoxyethylene isotridecyl ether (HLB=18.3, NOIGEN TDS-500F manufactured by Dai-ichi Kogyo Seiyaku Co, Ltd.)
AE: Polyoxyethylene branched alkyl (C11 to C13) ether (HLB=16.4, 70% aqueous solution, EMULGEN 1118S-70 manufactured by Kao Corporation)
ER: Reactive nonionic surfactant (ADEKA REASOAP ER-20 manufactured by ADEKA CORPORATION)
LE: Polyoxyethylene lauryl ether (HLB=16.1, NOIGEN NL-80 manufactured by Dai-ichi Kogyo Seiyaku Co, Ltd.)
<Anionic Surfactant>
DASS: Sodium bis(2-ethylhexyl) sulfosuccinate (75% aqueous solution, PELEX OT-P manufactured by Kao Corporation)
DES: Sodium polyoxyalkylene isodecyl ether sulfate (30% aqueous solution, HITENOL XJ-630S manufactured by Dai-ichi Kogyo Seiyaku Co, Ltd.)
TDES: Ammonium polyoxyethylene isotridecyl ether sulfate (HITENOL TM-07 manufactured by Dai-ichi Kogyo Seiyaku Co, Ltd.)
KH: Reactive anionic surfactant (AQUALON KH-10 manufactured by Dai-ichi Kogyo Seiyaku Co, Ltd.)
<Crosslinking Agent>
PGDG: Polypropylene glycol diglycidyl ether (Denacol EX-920 manufactured by Nagase ChemteX Corporation)
HDU: N,N'-hexaaminoethylene-1,6-bis(1-aziridine carboxyamide) (manufactured by
Sogo Pharmaceutical Co., Ltd.)
PAC: Aziridine compound (CX-100 manufactured by DSM NeoResins+)
ADH: Adipic acid dihydrazide (ADH manufactured by JAPAN FINECHEM COMPANY, INC.)
CDI: Polycarbodiimide resin (CARBODILITE V-02 manufactured by Nisshinbo Chemical Inc.)

<State and Appearance of Capsules>
⊚: Excellent
○: Good
Δ: Poor
x: Unworthy of evaluation The liquid crystal light control devices of Examples 1 to 7, particularly Examples 1 to 4, each had a high haze ratio and an excellent shielding property with no voltage applied, as well as having a low haze ratio and an excellent transparency with a voltage applied.

The invention claimed is:

1. A method for producing a liquid crystal light control device,
the device comprising two conductive film-coated substrates disposed so that the conductive films on the substrates face each other, and a liquid crystal-resin composite sandwiched between the two conductive film-coated substrates, the liquid crystal-resin composite having a resin matrix and liquid crystal microparticles dispersed in the resin matrix,
the method comprising:
step a) of obtaining an emulsion including a copolymer that has a glass transition temperature in the range of −50° C. to 20° C. by emulsion polymerization of a monomer group including a monomer A expressed by the following formula 1 as the main monomer and a monomer B having a nonionic hydrophilic group and a carbon-carbon double bond;
step b) of preparing, from a raw material including the emulsion and a liquid crystal material, a liquid crystal-resin composite material including the copolymer and liquid crystal microparticles dispersed therein;
step c) of forming, on the conductive film of a conductive film-coated substrate, a liquid crystal-resin composite comprising a resin matrix and liquid crystal microparticles being dispersed in the resin matrix by applying the liquid crystal-resin composite material onto the conductive film; and
step d) of bonding another conductive film-coated substrate to the liquid crystal-resin composite so that the liquid crystal-resin composite is sandwiched between the two conductive film-coated substrates, and the conductive films each are in contact with the liquid crystal-resin composite, wherein
the formula 1 is expressed as:

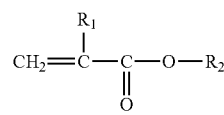

(1)

where $R_1$ is a hydrogen atom or a methyl group, and $R_2$ is an open chain alkyl group having a straight or branched chain with 1 to 20 carbon atoms or a cyclic alkyl group with 5 to 20 carbon atoms.

2. The method for producing the liquid crystal light control device according to claim 1, wherein
the monomer group further includes a monomer C having a carboxyl group and/or an amino group, and a carbon-carbon double bond, and
the amino group is a primary amino group or a secondary amino group.

3. The method for producing the liquid crystal light control device according to claim 2, wherein the monomer group comprises:
   75 to 99 mass % of the monomer A,
   0.1 to 15 mass % of the monomer B,
   0.1 to 15 mass % of the monomer C, and
   0 to 10 mass % of a monomer D, wherein
   the monomer D is a monomer not corresponding to any of the monomers A to C.

4. The method for producing the liquid crystal light control device according to claim 1, wherein
   the nonionic hydrophilic group in the monomer B is at least one selected from an amide group, a hydroxyl group and a polyoxyalkylene group.

5. The method for producing the liquid crystal light control device according to claim 1, wherein
   the monomer group includes, as the monomer A, a monomer $A_{I1}$ having a hydrogen atom as the $R_1$ and an open chain alkyl group that has a straight or branched chain with 2 to 8 carbon atoms as the $R_2$, and a monomer $A_{I2}$ having a methyl group as the $R_1$ and an open chain alkyl group that has a straight or branched chain with 1 to 4 carbon atoms as the $R_2$.

6. The method for producing the liquid crystal light control device according to claim 1, wherein
   in the step c), the liquid crystal-resin composite material is applied onto the conductive film with a crosslinking agent being included, and
   after the step c), a crosslinked structure is introduced into the copolymer using the crosslinking agent.

7. The method for producing the liquid crystal light control device according to claim 6, wherein
   the monomer group further includes a monomer C having a functional group that is a carboxyl group and/or an amino group and a carbon-carbon double bond,
   the crosslinking agent is capable of forming a crosslinked structure by reacting with the functional group included in the monomer C, and
   the amino group is a primary amino group or a secondary amino group.

8. A liquid crystal light control device comprising:
   two conductive film-coated substrates disposed so that the conductive films face each other; and
   a liquid crystal-resin composite disposed between the two conductive film-coated substrates, the liquid crystal-resin composite having a resin matrix and liquid crystal microparticles dispersed in the resin matrix, wherein
   the resin matrix comprises a copolymer of a monomer group including a monomer A expressed by the following formula 1 as the main monomer and a monomer B having a nonionic hydrophilic group and a carbon-carbon double bond, the copolymer having a glass transition temperature in the range of −50° C. to 20° C., and
   the formula 1 is expressed as:

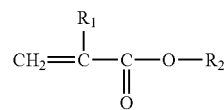

(1)

where $R_1$ is a hydrogen atom or a methyl group, and $R_2$ is an open chain alkyl group having a straight or branched chain with 1 to 20 carbon atoms or a cyclic alkyl group with 5 to 20 carbon atoms.

9. A liquid crystal light control device comprising:
   two conductive film-coated substrates disposed so that the conductive films face each other; and
   a liquid crystal-resin composite disposed between the two conductive film-coated substrates, the liquid crystal-resin composite having a resin matrix, liquid crystal microparticles dispersed in the resin matrix and a surfactant, wherein
   the resin matrix comprises a copolymer including a monomer expressed by the following formula 1 as the main monomer, having a nonionic hydrophilic group, and having a crosslinked structure being introduced therein, and
   the formula 1 is expressed as:

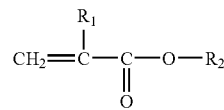

(1)

where $R_1$ is a hydrogen atom or a methyl group, and $R_2$ is an open chain alkyl group having a straight or branched chain with 1 to 20 carbon atoms or a cyclic alkyl group with 5 to 20 carbon atoms.

10. The liquid crystal light control device according to claim 9, wherein
    the nonionic hydrophilic group is an amide group and/or a hydroxyl group, and
    the monomer expressed by the formula 1 includes a monomer $A_{I1}$ having a hydrogen atom as the $R_1$ and an open chain alkyl group that has a straight or branched chain with 2 to 8 carbon atoms as the $R_2$, and a monomer $A_{I2}$ having a methyl group as the $R_1$ and an open chain alkyl group that has a straight or branched chain with 1 to 4 carbon atoms as the $R_2$.

11. The liquid crystal light control device according to claim 9, wherein
    the crosslinked structure is formed by the reaction between a crosslinking agent and a functional group that is a carboxyl group, an amino group and a hydroxyl group.

* * * * *